(12) United States Patent
Porzio et al.

(10) Patent No.: US 11,740,837 B2
(45) Date of Patent: *Aug. 29, 2023

(54) STORAGE TRAFFIC PATTERN DETECTION IN MEMORY DEVICES

(71) Applicant: Micron Technology, Inc., Boise, ID (US)

(72) Inventors: Luca Porzio, Casalnuovo di Napoli (IT); Roberto Izzi, Caserta (IT); Nicola Colella, Capodrise (IT); Danilo Caraccio, Milan (IT); Alessandro Orlando, Milan (IT)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,556

(22) Filed: Jul. 1, 2022

(65) Prior Publication Data

US 2022/0334773 A1    Oct. 20, 2022

(51) Int. Cl.
*G06F 3/06* (2006.01)
*G06F 12/06* (2006.01)

(52) U.S. Cl.
CPC .......... *G06F 3/0659* (2013.01); *G06F 3/0604* (2013.01); *G06F 3/0673* (2013.01); *G06F 12/0646* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 8,688,792 | B2 | 4/2014 | Singh et al. |
| 9,412,073 | B2 | 8/2016 | Brandt et al. |
| 9,836,471 | B2 | 12/2017 | Kaplan et al. |
| 9,934,104 | B2 | 4/2018 | Kushwah et al. |
| 10,182,466 | B2 | 1/2019 | Nirantar et al. |
| 10,241,691 | B2 | 3/2019 | Jain et al. |
| 10,372,916 | B2 | 8/2019 | Ayres et al. |
| 2010/0153347 | A1 | 6/2010 | Koester et al. |
| 2015/0074355 | A1 | 3/2015 | Sampathkumar et al. |

*Primary Examiner* — Gary W. Cygiel
(74) *Attorney, Agent, or Firm* — Brooks, Cameron & Huebsch, PLLC (57) ABSTRACT

A processing device of a memory sub-system can monitor a plurality of received commands to identify a forced unit access command. The processing device can identify a metadata area of the memory device based on the forced unit access command. The processing device can also perform an action responsive to identifying a subsequent forced unit access command to the metadata area.

20 Claims, 7 Drawing Sheets

STORAGE TRAFFIC PATTERN DETECTION IN MEMORY DEVICES

PRIORITY INFORMATION

This application is a Continuation of U.S. application Ser. No. 16/937,213, filed. Jul. 23, 2020, the contents of which are included herein by reference.

TECHNICAL FIELD

Embodiments of the disclosure relate generally to memory sub-systems, and more specifically, relate to storage traffic pattern detection in memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Various embodiments of the present disclosure are directed to memory sub-systems for storage traffic pattern detection in memory devices. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices, such as memory devices that store data. The host system can provide data to be stored at the memory sub-system and can request data to be retrieved from the memory sub-system.

The host system can send access requests (e.g., write command, read command) to the memory sub-system, such as to store data on a memory device of the memory sub-system and to read data from the memory device. The data to be read or written, as specified by a host request, is hereinafter referred to as "host data" or "user data". A host request can include logical address information (e.g., logical block address (LBA), namespace) for the host data, which is the location the host system associates with the host data. The host system can implement a file system to store the host data/user data in the memory sub-system. As used herein, a file system can comprise software that is implemented to control how data is stored and/or retrieved from the memory sub-system.

Write sequences for a particular file system can include write commands for a portion of memory that stores metadata. Write commands to logical block addresses (LBAs) may be stored in cache. Periodically, the data stored to the cache can be committed to a memory device of the memory sub-system. Some systems (e.g., EXT4 file system) block operations to the storage device until data and related metadata movement from cache to a memory device is successfully completed. The inability to process commands at a memory sub-system can lead to perceived system lag by a user. For example, some accesses to a file system may be temporarily unavailable (e.g., blocked) until particular operations, which may be considered system critical, are successfully completed. Such operations can include writes to particular metadata areas, which may be in association with a journal commit operation or other operation designed to maintain data integrity, for example. Accordingly, the unavailability of the file system for processing user level commands while it services particular metadata writes can be perceived as system lag, which may degrade user experience.

Various embodiments of the present disclosure address the above and other deficiencies. For example, a number of embodiments can provide for improved latency of operations directed to metadata areas associated with a file system, thereby improving user experience. For example, a number of embodiments can include identifying a particular file system based on input/output (IO) patterns. A particular area (e.g., LBA range) of the memory device used to store metadata for the file system can also be identified, and actions can be taken in order to improve the latency of accesses to the identified metadata areas. For example, such metadata area accesses may be prioritized over various other operations such as background and/or housekeeping operations including garbage collection operations.

As used herein, metadata refers to data that describes different data. Metadata can include data that describes file structures and/or data that describes a file system. For instance, metadata can be used for data integrity. Metadata can include specialized data structures which can describe internal file system structures (e.g., EXT4 journal). A metadata area describes a portion (e.g., LBA range) of memory device used to store the metadata.

The figures herein follow a numbering convention in which the first digit or digits correspond to the drawing figure number and the remaining digits identify an element or component in the drawing. Similar elements or components between different figures may be identified by the use of similar digits. For example, 221 may reference element "21" in FIG. 2, and a similar element may be referenced as 421 in FIG. 4. Analogous elements within a figure may be referenced with a hyphen and extra numeral or letter. See, for example, elements 226-1, . . . , 226-5 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
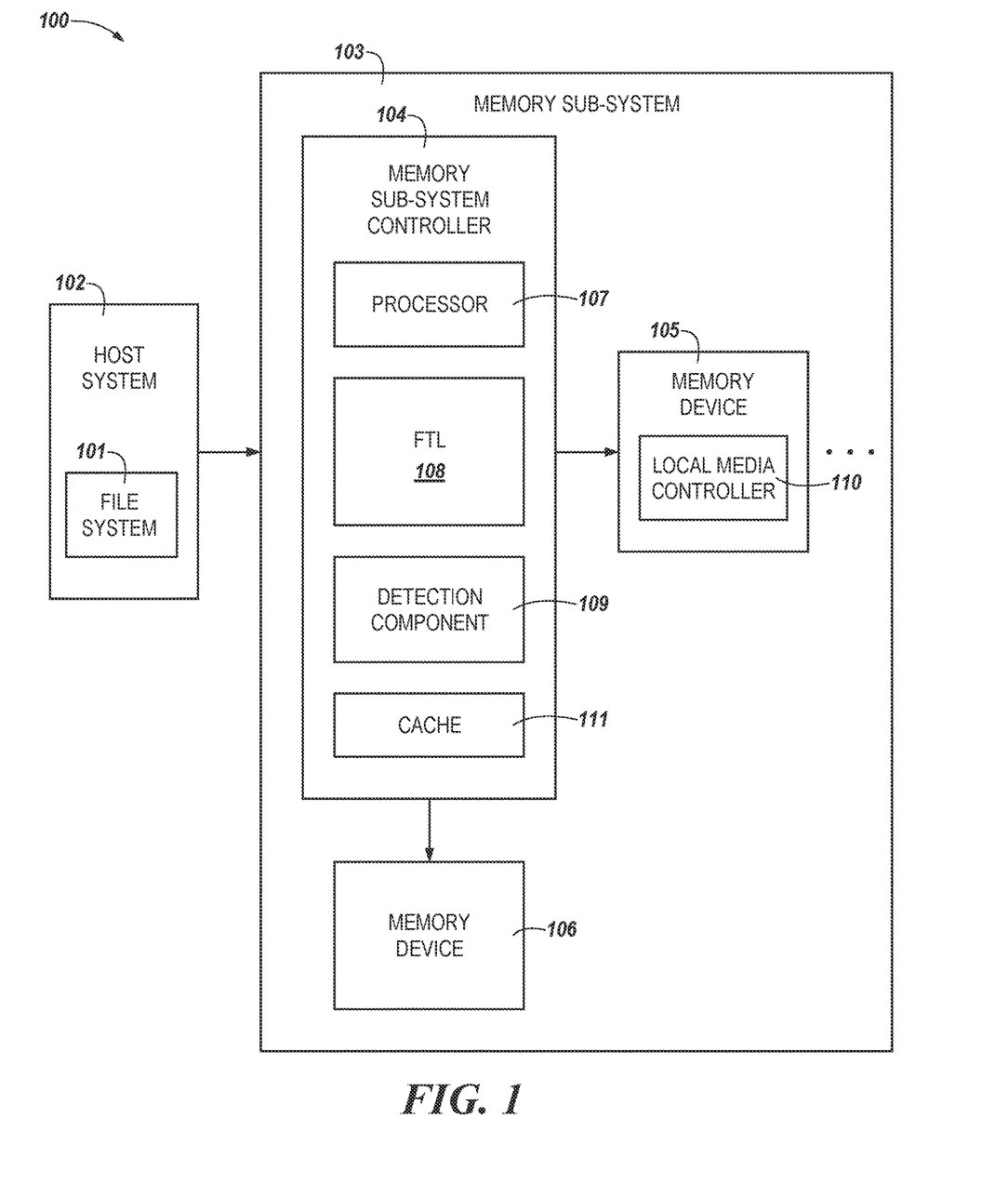
FIG. 1 illustrates an example computing system that includes a memory sub-system in accordance with some embodiments of the present disclosure.

FIG. 1 illustrates an example computing system 100 that includes a memory sub-system 103 in accordance with some embodiments of the present disclosure. The memory sub-system 103 can include media, such as one or more volatile memory devices (e.g., memory device 106), one or more non-volatile memory devices (e.g., memory device 105), or a combination of such.

A memory sub-system 103 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD), Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 102 that is coupled to one or more memory sub-systems 103. In some embodiments, the host system 102 is coupled to different types of memory sub-systems 103. FIG. 1 illustrates an example of a host system 102 coupled to one memory sub-system 103. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 102 can include a processor chipset and a software stack executed by the processor chipset. The processor chipset can include one or more cores, one or more caches, a memory controller (e.g., NVDIMM controller), and a storage protocol controller (e.g., peripheral component interconnect express (PCIe) controller, SATA controller). The host system 102 uses the memory sub-system 103, for example, to write data to the memory sub-system 103 and read data from the memory sub-system 103.

The host system 102 can be coupled to the memory sub-system 103 via a physical host interface. Examples of a physical host interface include, but are not limited to, a serial advanced technology attachment (ATA) interface, a PCIe interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 102 and the memory sub-system 103. The host system 102 can further utilize an NVM Express (NVMe) interface to access the memory component (e.g., memory devices 105) when the memory sub-system 103 is coupled with the host system 102 by the PCIe interface. The physical host interface can provide an interface for passing control, address, data, and other signals between the memory sub-system 103 and the host system 102. FIG. 1 illustrates a memory sub-system 103 as an example. In general, the host system 102 can access multiple memory sub-systems via a same communication connection, multiple separate communication connections, and/or a combination of communication connections.

The memory devices 105, 106 can include any combination of the different types of non-volatile memory devices 105 and/or volatile memory devices 106. The volatile memory devices (e.g., memory device 106) can be, but are not limited to, random access memory (RAM), such as dynamic random access memory (DRAM) and synchronous dynamic random access memory (SDRAM).

Some examples of non-volatile memory devices (e.g., memory device 105) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 105 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 105, 106 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 105, 106 can be grouped as pages that can refer to a logical unit of the memory device used to store data. With some types of memory (e.g., NAND), pages can be grouped to form blocks.

Although non-volatile memory devices 105 such as a 3D cross-point array of non-volatile memory cells and NAND type memory (e.g., 2D NAND, 3D NAND) and 3D cross-point array of non-volatile memory cells are described, the memory device 105 can be based on any other type of non-volatile memory or storage device, phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 104 (or controller 104 for simplicity) can communicate with the memory devices 105 to perform operations such as reading data, writing data, or erasing data at the memory devices 105 and other such operations. The memory sub-system controller 104 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 104 can be a microcontroller, special purpose logic circuitry (e.g., a field programmable gate array (FPGA), an application specific integrated circuit (ASIC), etc.), or other suitable processors.

The memory sub-system controller 104 can include a processor 107 (e.g., a processing device) configured to execute instructions stored in a local memory (e.g., not shown). The local memory of the memory sub-system controller 104 can include an embedded memory configured to store instructions for performing various processes, operations, logic flows, and routines that control operation of the memory sub-system 103, including handling communications between the memory sub-system 103 and the host system 102.

In some embodiments, the local memory can include memory registers storing memory pointers, fetched data, etc. The local memory can also include read-only memory (ROM) for storing micro-code, for example. While the example memory sub-system 103 in FIG. 1 has been illustrated as including the memory sub-system controller 104, in another embodiment of the present disclosure, a memory sub-system 103 does not include a memory sub-system controller 104, and can instead rely upon external control (e.g., provided by an external host, or by a processor or controller separate from the memory sub-system).

In general, the memory sub-system controller 104 can receive commands or operations from the host system 102 and can convert the commands or operations into instructions or appropriate commands to achieve the desired access to the memory devices 105 and/or the memory device 106. The memory sub-system controller 104 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 105. The memory sub-system controller 104 can further include host interface circuitry to communicate with the host system 102 via the physical host interface. The host interface circuitry can convert the commands received from the host system into command instructions to access the memory devices 105 and/or the memory device 106 as well as convert responses associated with the memory devices 105 and/or the memory device 106 into information for the host system 102.

The memory sub-system 103 can also include additional circuitry or components that are not illustrated. In some embodiments, the memory sub-system 103 can include a cache or buffer (e.g., DRAM) and address circuitry (e.g., a row decoder and a column decoder) that can receive an address from the memory sub-system controller 104 and decode the address to access the memory devices 105. In various examples, a local memory can comprise cache 111 that can be utilized in conjunction with the memory device 105/106.

In some embodiments, the memory devices 105 include a local media controller 110 that operates in conjunction with memory sub-system controller 104 to execute operations on one or more memory cells of the memory devices 105. An external controller (e.g., memory sub-system controller 104) can externally manage the memory device 105 (e.g., perform media management operations on the memory device 105).

In various examples, the memory sub-system 103 can be a managed NAND (MNAND) device in which an external controller (e.g., 104) is packaged together with one or more NAND die (e.g., 105). In an MNAND device, the external controller 104 can handle high level memory management functions such as media management, and the local media controller 110 can manage some of the lower level memory processes such as when to perform program-verify operations, MLC, TLC, QLC program operations and/or calibrations, etc.

The memory sub-system controller 104 can also include a flash translation layer (FTL) 108. The FM 108 can be responsible for various function. For example, the FTL 108 can perform address translation (e.g., logical to physical), garbage collection, ECC, and wear leveling, among other functions performed by the FTL 108.

The memory sub-system controller 104 can also include a detection component 109. The detection component 109 can comprise an ASIC configured to perform the examples described herein. While the detection component 109 can be implemented as circuitry (e.g., ASIC), the detection component 109 can also be implemented as firmware and/or software. For example, the firmware and/or software can include instructions, which when executed by the memory sub-system controller 104, can cause the memory sub-system controller 104 to perform the examples described herein such as the examples describe by FIGS. 3, 7, but not excluding the examples described in FIGS. 2, 4, 5, 6, 8. Although the detection component 109 is shown as being implemented separate from the FTL 108, the detection component 109 can be part of the FTL 108. The detection component 109 can detect a metadata area of the memory devices 105/106. Types of metadata areas can vary depending on the particular file system but can include a journal area, for example. The detection component 109 can also determine a particular file system 101 associated with writes to the metadata area(s) of the memory devices 105/106.

As used herein, the file system 101 controls how data is stored and retrieved. The file system 101 can control how data is separated as stored in the memory sub-system 103. The file system 102 can control the naming of data and/or portions (e.g., separated portions) of data. The file system 102 can control the structure and logical rules used to manage the data stored in the memory sub-system 103. The file system 101 can be a network file system, a database file system, a transactional file system, and/or a mobile device file system, for example. A mobile file system can be a fourth extended (EXT4) file system or a flash friendly file system (F2FS), for example.

The detection component 109 can further detect an IO pattern for the metadata area and/or the user area of the memory devices 105/106. As used herein, the terms detect, identify, and determine are used interchangeably.

The detection component 109 can, for instance, determine a file system type and/or a location of a metadata area (e.g., LBA range) associated with the file system based on a detected IO pattern. For example, forced unit access commands of an IO pattern can be monitored (e.g., tracked) and used to identify a metadata area given that the file system metadata areas are often accessed via forced unit accesses.

For instance, file systems often employ forced unit access commands in a particular identifiable pattern in association with accessing a metadata area. Therefore, the forced unit access commands can also be used to detect a particular IO pattern. As used herein, a forced unit access command is a write command whose corresponding data is written directly to the memory device, bypassing the write cache (e.g., the cache 111).

Figure 2:
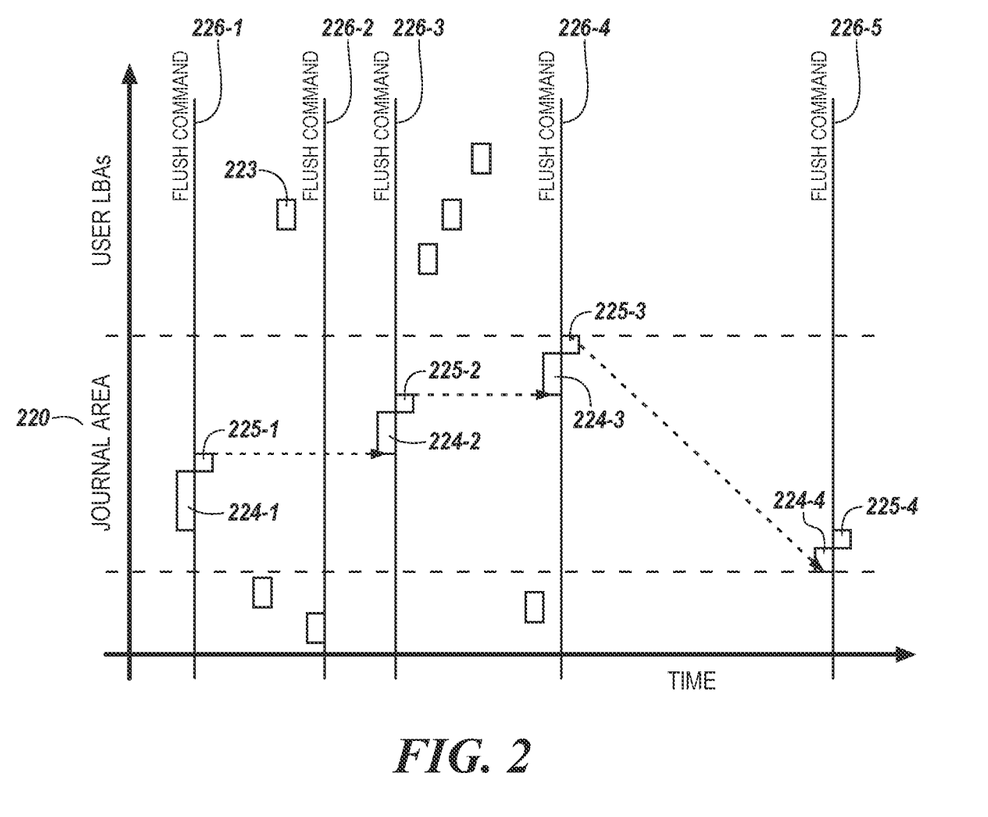
FIG. 2 is a graph illustrating LBAs to which a sequence of commands are directed in accordance with some embodiments of the present disclosure.

FIG. 2 is a graph illustrating LBAs to which a sequence of commands are directed in accordance with some embodiments of the present disclosure. In FIG. 2, the x-axis represents time and the y-axis represents the LBA space corresponding to the memory device. As shown in FIG. 2, the LBA space includes a journal area 220. The remainder of the LBA space can be used for user data (e.g., the user LBAs), additional journal areas, and/or other metadata, for example.

The journal area 220 can be a dedicated metadata area of a journaling file system used to track file system changes not yet committed to storage. For example, the journal area 220 can store pointers to user LBAs and/or pointers to the journal area 220. The journal area 220 can also be referred to as a journal 220. The journal 220 can be implemented as a circular buffer. As an example, the journal 220 described in association with FIG. 2 can be associated with a journal block device of a journaling file system such as the extended 4 (EXT4) file system for Linux. Although the examples described in association with FIGS. 2-4 relate to an EXT4 file system, embodiments are not limited to a particular type of journaling file system.

FIG. 2 illustrates a plurality of write commands 223, journal write commands 224-1, 224-2, 224-3, and 224-4 (referred to collectively as journal write commands 224), and journal commit commands 225-1, 225-2, 225-3, and 225-4 (referred to collectively as journal commit 225). As used herein, journal write commands (e.g., 224) refer to write commands directed to a journal area (e.g., 220), whereas regular write commands (e.g., 223) refer to write commands directed to a user LBA space. The journal commit commands 225 refer to a sequence of a flush command 226 followed by a forced unit access command (to the journal area 220). A forced unit access command refers to a write command whose corresponding data is written directly to the memory device, bypassing the write cache. Therefore, a journal commit 225, which is used at the end of a series of journal writes 224, involves a forced unit access following a flush command such that the data corresponding to the forced unit access is written directly to the memory device without utilizing a cache of the memory sub-system. In contrast to forced unit accesses, the journal write commands 224 and regular write commands 223 are written to a cache (e.g., write cache) of the memory sub-system prior to being written to the memory device (via a flush command). The cache can be implemented in various locations within a memory subsystem (e.g., 103 shown in FIG. 1). For example, the cache may be located on a memory device such as memory device 105, 106 and/or in local memory on the controller 104, among other locations.

A file system journal (e.g., EXT4 journal) can have identifiable (e.g., specific) traffic patterns (in terms of IO traffic) associated therewith during particular system utilization. The robustness and performance of the system can be sensitive to the performance of the journal area 220. If the storage device can handle the traffic to the journal area 220 with fast performance and reliable data storage, then the user experience may benefit. Since the locations of one or more journals (e.g., 220) are unknown to a file system, it can be beneficial to identify the journal area(s) in order to improve system performance.

As an example, consider user updates a database (e.g., when the user inserts a new telephone number, makes a new photo, synchronizes its account with cloud services, among others), which can involve at least two or three write operations in the journal area 220, which may be referred to as a journal of the journal. In accordance with a number of embodiments, upon determining the location of a journal area (e.g., 220), the memory sub-system can detect accesses to the journal area 220 and can act to speed up the performance of the detected accesses (as compared to the speed at which the accesses would have been performed had they not been identified as being directed to the journal area) thereby providing improved database performance and/or user experience. Also, since the write traffic issued to the storage device by a particular file system is a consistent percentage of the total write traffic throughout the lifespan of the storage device, by containing this traffic in specific underling device areas (e.g. in NAND SLC blocks) the overall endurance of the storage device can be enhanced.

A file system provides commands to the memory sub-system utilizing a particular protocol, such as an embedded multi-media controller (eMMC) protocol or a small computer system interface (SCSI) protocol, for example. The SCSI protocol can be associated with a universal flash storage (UFS) device and/or a solid state drive (SSD), for example.

Various examples described herein refer to file system commands generically as read, write, flush, forced unit access, read meta data, write metadata, discard, etc., since the specific file system commands are protocol dependent, and the file system is likely unaware of the underlying storage device (e.g., eMMC, UFS, SSD, etc.). Table 1 is provided as an example mapping of protocol specific commands/flags to generic file system commands. For example, a read command, as shown in Table 1, can be provided as a READ_10 command using a SCSI protocol. A write commands can be provided as a WRITE_10 command using a SCSI protocol. A forced unit access command can be provided as a WRITE_10 with a FUA tag (e.g., flag) using the SCSI protocol. A write command related to user file metadata can be provided as a WRITE_10 command using a system data tag (e.g. flag) using the SCSI protocol or a CMD23 or a CMD 25 with a DATA_TAG tag using the eMMC protocol. As used herein, a read or mite command to a metadata area can comprise a command having a tag such as a DATA_TAG or a system data tag which can be referred to as a data tag.

TABLE 1

|  | eMMC | SCSI (e.g. UFS, SSD) |
| --- | --- | --- |
| Read | CMD17/CMD23+CMD18/ CMD44+CMD45+CMD46 | READ_10 |
| Write (Regular) | CMD24/CMD23+CMD25/ CMD44+CMD45+CMD47 | WRITE_10 |
| Forced unit access | CMD23+CMD25 with REL_WRITE bit set | WRITE_10 with FUA bit set |
| Write (Metadata) | CMD23/CMD25 with DATA_TAG bit set | WRITE_10 using System Data Tag group number |
| Flush | CMD6 | SYNCHRONIZE_CACHE |
| Discard | CMD35/CMD36/CMD38 | UNMAP |

The EXT4 journal area 220 can have a specific traffic during regular system utilization. During regular utilization of the system, the journal area 220 can be accessed with a number of criteria. For example, a first criteria can include that journal write commands are executed in LBA sequential order. As used herein, LBA sequential order describes that a journal write at position N and consisting of M LBAs is followed by another journal write at position N+M. For example, an end LBA of a first write command to the journal area 220 can be adjacent to a start LBA of a second write command to the journal area 220. LBAs (e.g., first LBA and second LBA) can be adjacent if a first LBA is followed by a second LBA without a third LBA existing between the first LBA and the second LBA.

A second criteria can include that a series of regular write commands to the journal area 220 (e.g., the journal write commands 224) will end with a flush command (e.g., flush commands 226-1, 226-2, 226-3, 226-4, and 226-5) followed by a forced unit access command. This specific sequence of a flush command (e.g., 226) followed by a forced unit access command can be referred to as a journal commit (e.g., 225). It is noted that the journal commit commands 225 represent the combination of a forced unit access command to the journal area 220 and a corresponding respective flush command 226 immediately preceding the forced unit access. As used herein, a flush command refers to a command executed to move data from cache to a memory device. For example, the journal write commands 224 can involve writing to cache. The flush command can be used to commit the data from cache to the memory device. The forced unit access command involves storing data corresponding to the journal commits 225 directly to the memory device without first being written to the cache (e.g., the write cache is bypassed).

The journal area 220 can be identified (e.g., the particular LBA range can be determined) based on the first criteria and/or the second criteria. For example, the journal area 220 can be identified by determining that the write commands are being executed in sequential LBA order. The journal area 220 can also be identified based on a flush command being followed by a forced unit access command. A forced unit access command can be identified by the use of a tag (e.g., REL_WRITE and/or FUA tags).

FIG. 2 shows the sequential and cyclic nature of the journal area 220 and the specific sequence of commands used to access the journal area 220. In various embodiments, each journal write command 224 (or series of journal write commands) is followed by a flush command and a forced unit access command. As noted above, the specific sequence of a flush command 226 followed by a forced unit access command is referred to as a respective journal commit command 225. For example, the journal write command 224-1 is sequentially followed by flush command 226-1 and a forced unit access corresponding to the journal commit command 225-1. As shown in FIG. 2, within the journal area 220, write commands are executed in sequential order. For example, the starting LBA corresponding to journal write 224-2 is adjacent to the end LBA corresponding to journal commit 225-1. That is, the ending LBA of the forced unit access corresponding to journal commit 225-1 immediately precedes the beginning LBA corresponding to journal write 224-2.

In various embodiments, and as shown in FIG. 2, the journal area 220 can be implemented as a circular buffer, for example, such that the beginning and ending LBAs are treated as adjacent LBAs. For instance, the end LBA of the journal commit command 225-3 corresponds to the end LBA of the journal area 220 and the start of the journal write command 224-4 corresponds to the start LBA of the journal area 220. In various examples, the journal write command 224-4 can be considered as occurring sequentially to the journal commit 224-3 due to the journal write command 224-4 being adjacent to the journal commit command 225-4 and the journal commit command 225-4 being adjacent to the journal write command 224-1. As described further herein, in accordance with a number of embodiments of the present disclosure, the cyclic nature of the access pattern associated with the journal area 220 can be used to identify the particular location (e.g., LBA range) of the journal area 220 within the LBA space of a memory device.

Figure 3:
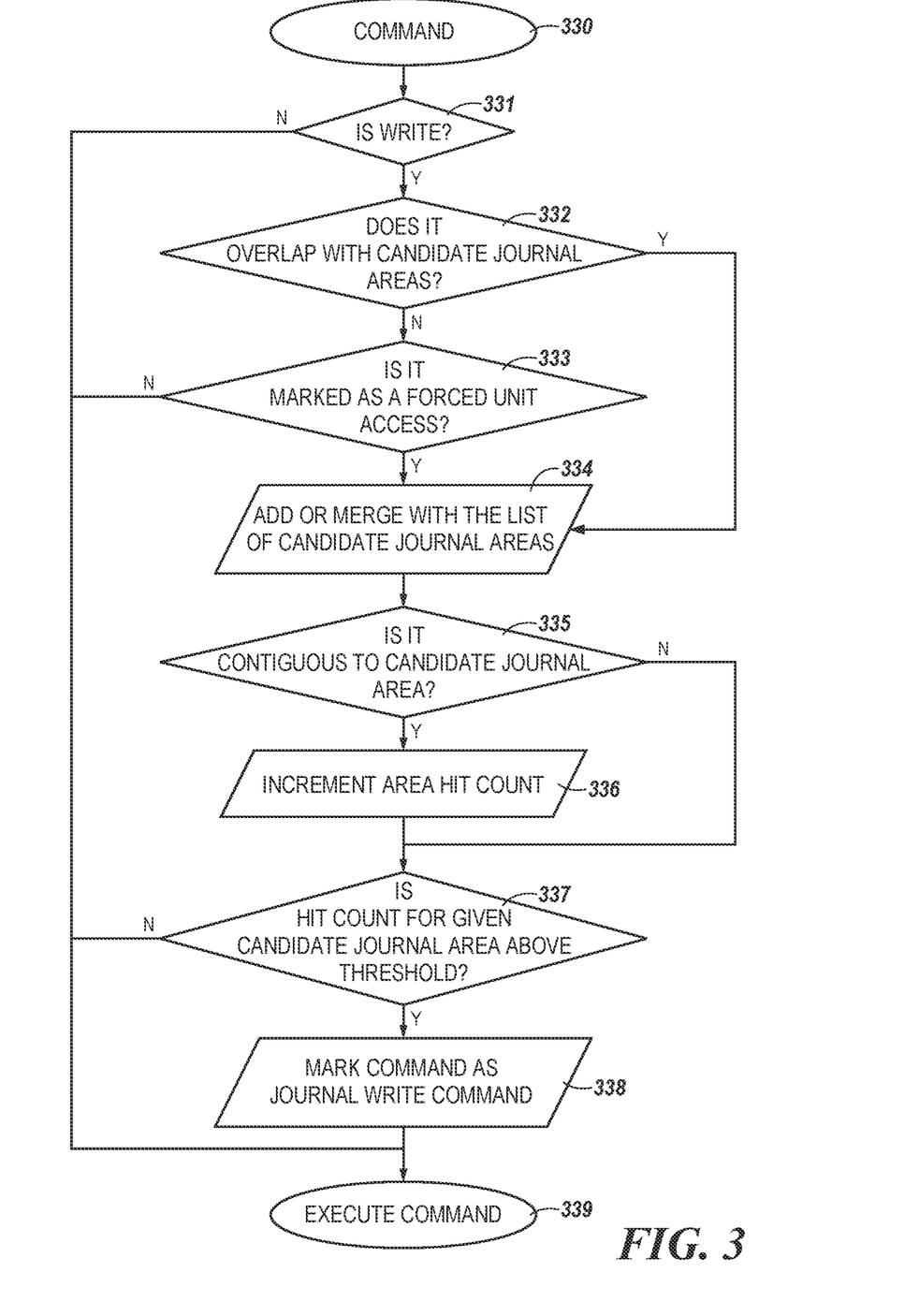
FIG. 3 illustrates an example of a method for identifying a journal area in accordance with some embodiments of the present disclosure.

FIG. 3 illustrates an example of a method for identifying a journal area in accordance with some embodiments of the present disclosure. The method can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by the detection component 109 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method includes, at 330, receiving a command (e.g., at a memory sub-system from a host). At 331, the method includes determining whether the command is a write command. If the received command is not a write command, then it is executed as shown at 339.

If the received command is a write command, at 332, the method includes determining whether the received command is contiguous or overlaps with a candidate journal area (e.g., journal, area 220). As used herein, a candidate journal area describes a range of LBAs that may have the possibility of being a journal area, Access commands to the candidate journal area can be tracked to determine whether the candidate journal area is used sufficient to consider the candidate journal area as a journal area. Overlapping with regards to a candidate journal area describes whether the range of LBAs of the received command is within the range of LBAs of the candidate journal area. Overlapping can also describe whether the LBAs of the received command are continuous with the LBAs of the candidate journal area. In FIG. 2, the journal write command 224-4 does not overlap with the candidate journal area which can include the LBAs of the journal write commands 224-1, 224-2, and 224-3, for example. The journal write commands 224-3 can overlap with the candidate journal area which includes the LBAs of the journal write commands 224-1 and 224-2, for example.

If the received command overlaps with the candidate journal area, then the method continues to 334, If the received command does not overlap with the candidate journal area, then the method continues to 333. At 333, the received command can be reviewed to determine whether the receive command is a forced unit access command. The method can determine whether the received command comprises or is associated with a tag. A tag associated with the received command can be reviewed to determine whether the tag is one of REL_WRITE tag or a FUA tag. If the tag associated with the receive command is one of a REL_WRITE tag or a FUA tag, then the received command can be a forced unit access command. If the received command is a forced unit access command, then the method can continue to 334. If the received command is not a forced unit access command, then the method may continue to 339.

Although the method can include determining whether the received method overlaps with the candidate journal area and determining whether the received command is a forced unit access command, the method can perform both determinations in a different order or only perform one of the determinations. For example, the method can determine whether the received command is a forced unit access command prior to determining whether the received command overlaps with the candidate journal area. The method can, alternatively, only perform one of the determinations including determining whether the received command overlaps with the candidate journal area or determining whether the received command is a forced unit access command.

At 334, the method can include adding or merging with the list of candidate journal areas. A new candidate journal area can be added to a list of candidate journal areas if the received command does not overlap with a candidate journal area and is a forced unit access command. The received command can be merged with the candidate journal area if the received command overlaps with the candidate journal area. A command can be merged with the candidate journal area if the LBAs of the received command are merged with (e.g., added to) the LBAs of the candidate journal area.

The method can then continue to 335. At 335, a determination can be made as to whether the received command and/or the newly created candidate journal area is contiguous to an already existing candidate journal area. A received command or a newly created candidate journal area can be contiguous if the LBAs of the newly created candidate journal area or the received command are adjacent to the LBAS of the already existing candidate journal area. If the received command or the newly created candidate journal area is contiguous to the already existing candidate journal area, then the method continues to 336. If the received command or the newly created candidate journal area is not contiguous to the already existing candidate journal area, then the method continues to 337.

At 336, a counter can be incremented for the already existing candidate journal area. The counter can be referred to as a hit counter. The counter can represent a use of the already existing candidate journal area. For instance, the more a candidate journal area is used in a contiguous manner then the more likely the candidate journal area is in fact the journal area. The method can continue to 337 after incrementing the counter for the already existing candidate journal area. At 337, the method can include determining if the counter for the candidate journal area is greater than a threshold. If the counter is greater than the threshold, then the method can mark the received command as a journal write command and/or can mark the candidate journal area as a journal area, Marking the received command as a journal write command and/or the candidate journal area as a journal area can provide the ability to expedite execution of the journal write command to limit the stalling of the memory device, memory sub-system, and/or computing environment. The method can then continue to 339 by executing the received command.

Figure 4:
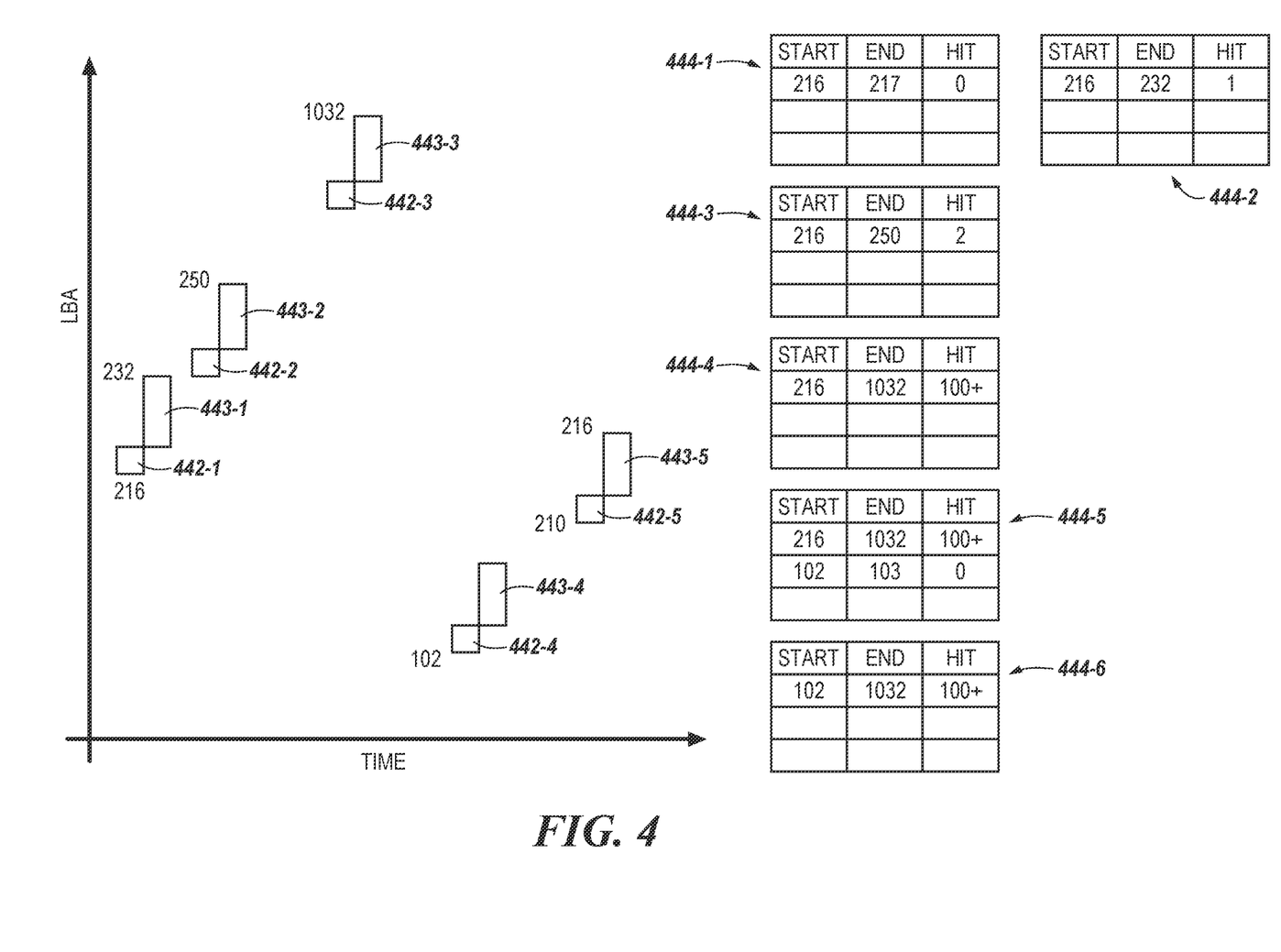
FIG. 4 is a graph illustrating LBAs to which a sequence of commands are directed and a number of tables corresponding thereto in accordance with some embodiments of the present disclosure.

FIG. 4 is a graph illustrating LBAs to which a sequence of commands are directed and a number of tables (444-1, 444-2, 444-3, 444-4, 444-5, and 444-6) corresponding thereto in accordance with some embodiments of the present disclosure.

In FIG. 4 the x-axis represents time and the y-axis represents the LBA space corresponding to the memory device. The graph shows that the journal write command 442-1 is executed before the journal commit command 443-1 and that the journal write command 442-1 and the journal commit command 443-1 are contiguous. The graph shows that the journal write command 442-2 was executed before the journal commit command 443-2 and that the journal write command 442-2 and the journal commit command 443-2 are contiguous. The graph further shows that the journal write command 442-3 was executed before the journal commit command 443-3 and that the journal write command 442-3 and the journal commit command 443-3 are contiguous. The graph shows that the journal write command 442-4 was executed before the journal commit command 443-4 and that the journal write command 442-4 and the journal commit command 443-4 are contiguous. The graph further shows that the journal write command 442-5 was executed before the journal commit command 443-5 and that the journal write command 442-5 and the journal commit command 443-5 are contiguous. The example provided in FIG. 4 implements the method provided in FIG. 3.

In table 444-1, a first candidate journal area is created responsive to the journal write command 442-1 being received. The journal write command 442-1 can cause data to be written to a start LBA (e.g., 216) and an end LBA (e.g., 217) of the memory device. In this example, the first candidate journal area is determined to not overlap with other candidate journal areas since command 442-1 is the first command received. The counter for the newly created candidate journal area is not incremented because the newly created candidate journal area and/or the received command are not contiguous to a different candidate journal area.

In table 444-2, the journal commit command 443-1 overlaps with the first candidate journal area and is a forced unit access command resulting in a merger of the journal commit command 443-1 with the first candidate journal area. The journal commit command 443-1 can cause data to be written to a start LBA (e.g., 217) and an end LBA (e.g., 232). Given that the journal commit command 443-1 is contiguous with the first candidate journal area, the counter associated with the first candidate journal area is incremented (e.g., 1). The contiguousness of a journal commit command and/or a journal write command with a candidate journal area can be referred to as a "hit". The counter can be incremented if there is a hit (e.g., if a journal commit command and/or a journal write command is contiguous with a candidate journal area). The journal commit command 443-1 may not be labeled as a journal write command given that the counter associated with the first candidate journal area is not greater than a threshold. A threshold can be, for example, more than 100 hits. Although the threshold can be more or less than 100 hits. The journal commit command 443-1 can be executed.

In table 444-3, the journal write command 442-2 overlaps with the first candidate journal area resulting in a merger of the journal write command 442-2 with the first candidate journal area. Given that the journal write command 442-2 is contiguous with the first candidate journal area, the counter associated with the first candidate journal area is incremented (e.g., 2). The journal write command 442-2 may not be labeled as a journal write command given that the counter associated with the first candidate journal area is not greater than a threshold. The journal write command 442-2 can be executed. In table 444-3, the journal commit command 443-2 also overlaps with the first candidate journal area and is a forced unit access command resulting in a merger of the journal commit command 443-2 with the first candidate journal area. Given that the journal commit command 443-2 is contiguous with the first candidate journal area, the counter associated with the first candidate journal area is incremented (e.g., 3). The journal commit command 443-2 may not be labeled as a journal write command given that the counter associated with the first candidate journal area is not greater than a threshold. The journal commit command 443-2 can be executed.

In table 444-4, the journal write command 442-3 overlaps with the first candidate journal area resulting in a merger of the journal write command 442-3 with the first candidate journal area. Given that the journal write command 442-3 is contiguous with the first candidate journal area, the counter associated with the first candidate journal area is incremented (e.g., 100+). The journal write command 442-3 may be labeled as a journal write command given that the counter associated with the first candidate journal area is greater than a threshold. The journal write command 442-3 can be executed differently than the execution of the journal write commands 442-1 and 442-2 based on the identification of the command 442-3 as a journal write command. In table 444-4, the journal commit command 443-3 also overlaps with the first candidate journal area and is a forced unit access command resulting in a merger of the journal commit command 443-3 with the first candidate journal area. Given that the journal commit command 443-3 is contiguous with the first candidate journal area, the counter associated with the first candidate journal area is incremented (e.g., 100+). The command 443-3 may be labeled as a journal write command given that the counter associated with the first candidate journal area is greater than a threshold. The journal commit command 443-3 can be executed.

In table 444-5, the journal write command 442-4 does not overlap with the first candidate journal area resulting in a new candidate journal area being created. The new candidate journal area can be referred to as a second candidate journal area. Given that the journal write command 442-4 or the second candidate journal area is not contiguous with the first candidate journal area, the counter associated with the first candidate journal area is not incremented. The journal write command 442-4 may not be labeled as a journal write command given that the counter associated with the second candidate journal area is not greater than a threshold.

Although not shown, the journal commit command 443-4 overlaps with the second candidate journal area but does not overlap with the first candidate journal area, and is a forced unit access command resulting in a merger of the journal commit command 443-4 with the second candidate journal area. Given that the journal commit command 443-4 is contiguous with the second candidate journal area, the counter associated with the second candidate journal area is incremented (e.g., 1). The journal commit command 443-4 may not be labeled as a journal write command given that the counter associated with the first candidate journal area is not greater than a threshold. The journal commit command 443-4 can be executed.

In table 444-6, the journal write command 442-5 overlaps with the second candidate journal area resulting in a merger of the journal write command 442-5 with the second candidate journal area. Given that the journal write command 442-5 or the second candidate journal area is not contiguous with the first candidate journal area, the counter associated with the first candidate journal area is not incremented although the counter associated with the second candidate journal area is incremented. The journal write command 442-5 may not be labeled as a journal write command given that the counter associated with the second candidate journal area is not greater than a threshold.

The journal commit command 443-5 overlaps with the second candidate journal area and the first candidate journal area, and is a forced unit access command resulting in a merger of the journal commit command 443-4 with the first candidate journal area and the second candidate journal area. The first candidate journal area and the second candidate journal area can also be merged given that they are contiguous. Given that the journal commit command 443-5 is contiguous with the second candidate journal area and the first candidate journal area, the counter associated with the first candidate journal area is incremented (e.g., 100+). The journal commit command 443-5 may be labeled as a journal write command given that the counter associated with the first candidate journal area is greater than a threshold. The journal commit command 443-5 can be executed. Merging two different candidate journal areas can result in the deletion of one of the candidate journal areas and the continuity of the other candidate journal area.

Figure 5:
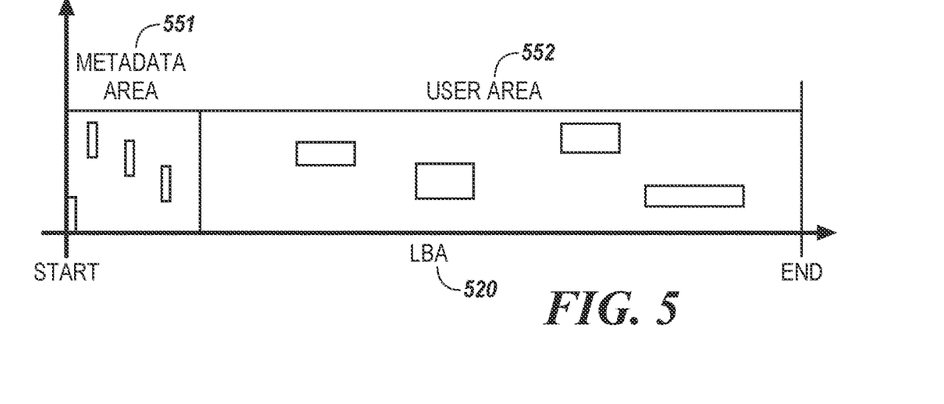
FIG. 5 illustrates an example of a metadata area in accordance with some embodiments of the present disclosure.

FIG. 5 illustrates an example of a metadata area 551 in accordance with some embodiments of the present disclosure. As previously described, the examples of FIG. 5 and FIG. 6 are provided in the context of the F2FS.

The layout of the F2FS can include a superblock area, a checkpoint area, a segment info table (SIT) area, a node address table (NAT) area, a segment summary (SS) area, and a main area. The superblock (SB) area is accessed during platform boot in read mode and at format time in write mode. The checkpoint (CP) area is accessed using a forced unit access command. The SIT, NAT, and/or SS areas are accessed using metadata read and write commands. Commands used to read or write to the metadata area 551 can be tagged (e.g., flagged) with the DATA_TAG tag. The main area is accessed with regular read and write commands to access user data from a user area 552.

FIG. 5 shows a graph comprising a range of LBAs 520. The range of LBAs 520 includes a start FBA and an end LBA for the metadata area 551 and the user area 552.

Figure 6:
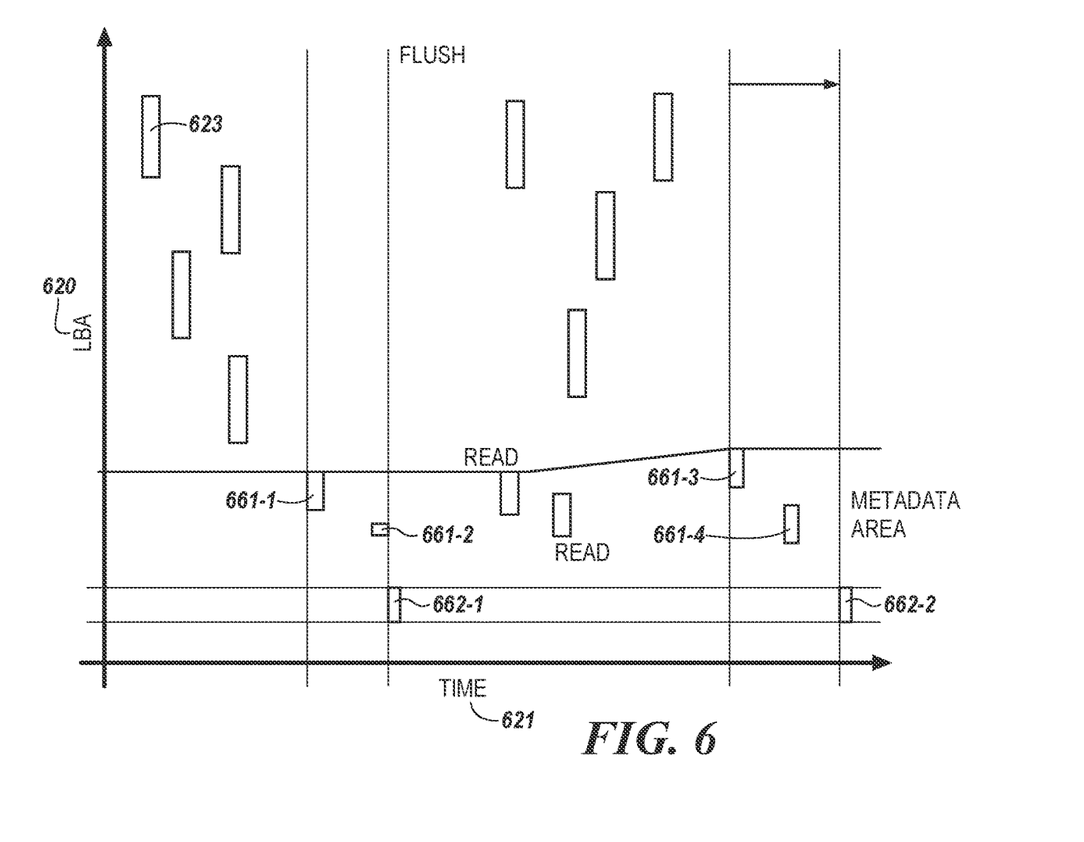
FIG. 6 illustrates an example of a metadata area in accordance with some embodiments of the present disclosure.

FIG. 6 illustrates an example of a metadata area in accordance with some embodiments of the present disclosure. FIG. 6 includes a graph comprising an x-axis representing time 621 and a y-axis representing LBAs 620. The graph shows write commands 623, metadata write commands 661-1, 661-2, 661-3, and 661-4, and checkpoint commands 662-1 and 662-2. The metadata write commands 661-1, 661-2, 661-3, and 661-4 can be referred to as metadata write commands 661. The checkpoint commands 662-1 and 662-2 can be referred to as checkpoint commands 662. The checkpoint commands 662 can also be referred to as forced unit access commands 662. The existence of a checkpoint can be used to identify that the file system is an F2FS. Furthermore, forced unit access commands to a same range of LBAs can signify use of the F2FS.

The F2FS traffic can be divided in a number of phases. A first phase can include writing and reading data from a user area (e.g., the user area 552 in FIG. 5) using access commands 623 (e.g., write commands and/or read commands, for example). During the first phase a plurality of commands are directed to the user area. The plurality of commands includes the read command, the write command, the flush command, and the discard command, among other possible commands. Some of the commands in the first phase can also be directed to the metadata area including the SIT area, the NAT area, and/or the SS area (e.g., SSA).

A second phase can include flushing metadata. During the second phase write commands are directed to the metadata area including the SIT area, the NAT area, and/or the SSA. The write commands to the metadata area can be identified using the DATA_TAG tag, for example. A third phase can include flushing and checkpoints. The end of the third phase is marked by a flush command followed by a write to the checkpoint area. The write to the checkpoint area can be a forced unit access command. The checkpoint area can be identified by identifying commands that are forced unit access commands 662.

The second phase and the third phase can be identified at a protocol level. For example, in an eMMC protocol the start of the second phase can be identified by monitoring a DATA_TAG tag in write operations. The third phase can be detected by monitoring for the REL_WRITE tag. For example, a REL_WRITE tag can be identified in a write command. The identification of the REL_WRITE tag can be used to identify the third phase. The REL_WRITE tag can also be used to identify that a command is a forced unit access command. The detection circuitry (e.g., detection circuitry in FIG. 1) can take actions to improve latency of the operations when the second and third phase are detected. For example, identifying the second phase and the third phase can allow for a determination of the file system being used. Identifying the second phase and the third phase can provide for the determination of the metadata area and an identification of an IO pattern.

In FIG. 6 the metadata write commands 666-1 and 666-2 can be identified responsive to the metadata write commands 666-1 and 666-2 utilizing a DATA_TAG tag. The flush commands can be used to identify the end of the second phase and the beginning of the third phase. The use of a REL_WRITE tag with a command can signal the checkpoint area. The checkpoint area can occur in the same LBAs such that repeated commands to a same number of LBAs can also signal the checkpoint area/the third phase. The of the checkpoint area can be determined based on the LBA's of the forced unit access commands. For example, the start LBA and end LBA of the checkpoint can be determined as the start LBA and the end LBA of the forced unit access commands 662-1 and 662-2. The start LBA and end LBA of the forced unit access commands 662-1 and 662-2 can be used (e.g., assigned) as the start LBA and end LBA of the checkpoint area. The forced unit access commands 662-1 and 662-2 can be monitored to ensure that the forced unit access commands 662-1 and 662-2 have the same start LBA and end LBA.

The metadata write commands 661-3 and 661-4 can be observed. The LBAs corresponding to the metadata write commands 661-3 and 661-4 can be different than the LBAs corresponding to the metadata write commands 661-1 and 661-2. The LBAs of the metadata area can be updated if the metadata write commands 661-3 and 661-4 utilize commands that have a different LBA range than the metadata write commands 661-1 and 661-2.

Figure 7:
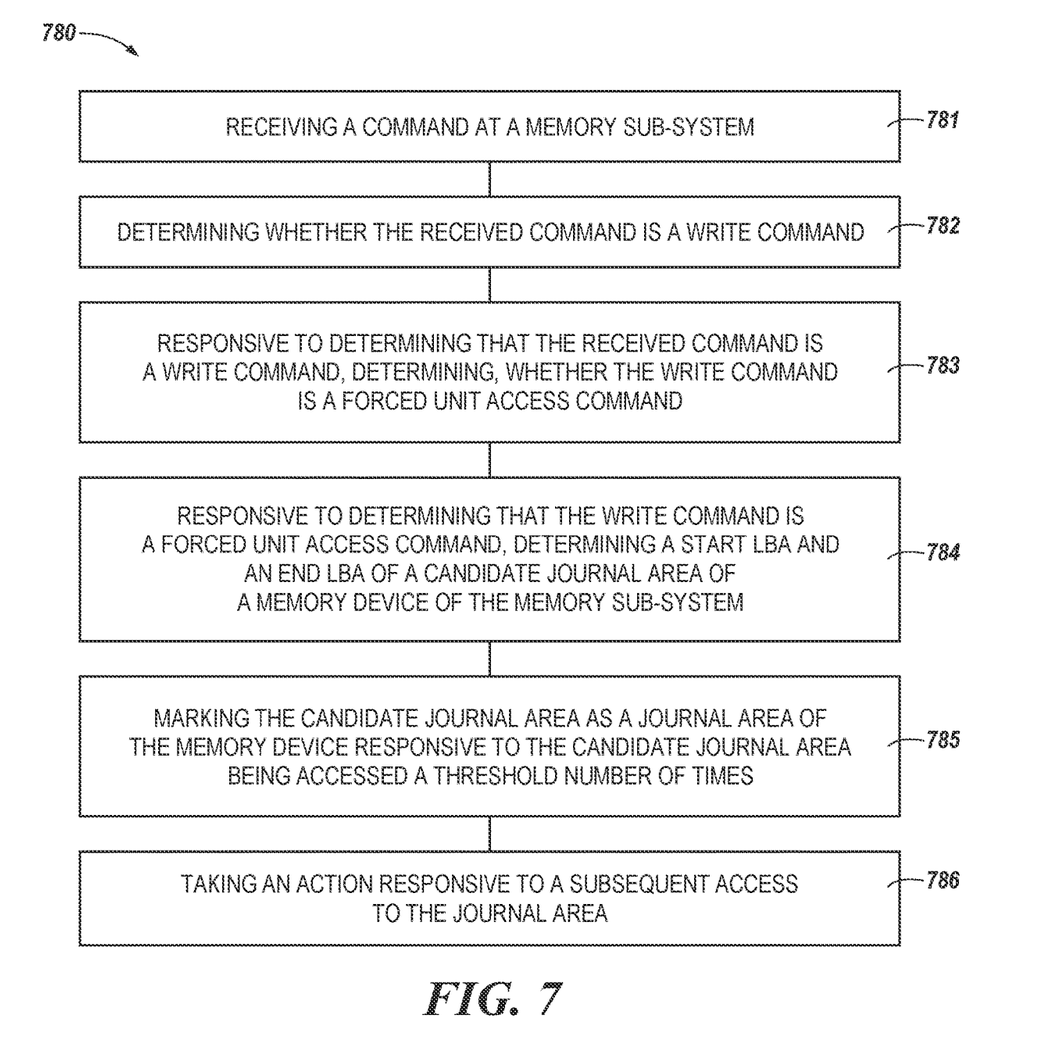
FIG. 7 is a flow diagram of an example method for detection circuitry in accordance with some embodiments of the present disclosure.

FIG. 7 is a flow diagram of an example method 780 corresponding to detection circuitry in accordance with some embodiments of the present disclosure. The method 780 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 780 is performed by the detection component 109 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 781, a command can be received at a memory sub-system. At 782, a determination can be made as to whether the received command is a write command. For example, it can be determined whether the command is a regular write command and/or a forced unit access command. At 783, responsive to determining that the received command is a write command, a determination can be made as to whether the write command is a forced unit access command. At 784, responsive to determining that the write command is a forced unit access command, a start LBA and an end LBA of a candidate journal area of a memory device of the memory sub-system can be determined. At 785, the candidate journal area can be marked as a journal area of the memory device responsive to the candidate journal area being accessed a threshold number of times. At 786, an action can be taken responsive to a subsequent access to the journal area.

The method 780 can further comprise receiving a different command at the memory sub-system. The method 780 can also include, responsive to determining that the received different command is a different write command, determining whether a start LBA and an end LBA for the different write command overlaps with the start LBA and the end LBA of the candidate journal area. Responsive to determining, via control circuitry of the memory sub-system, that the start LBA and the end LBA for the different write command overlaps with the start LBA and the end LBA of the candidate journal area, the start LBA and the end LBA of the candidate journal area can be updated to include the start LBA and the end LBA of the different write command. Updating the start LBA and the end LBA of the candidate journal area can include setting the start LBA and/or the end LBA of the different write command as the start LBA and/or the end LBA of the candidate journal area such that the difference between the start LBA and the end LBA of the candidate journal area is greater than prior to the updating. Responsive to determining that the start LBA and the end LBA for the different write command does not overlap with the start LBA and the end LBA of the candidate journal area, a determination can be made as to whether the different write command is a different forced unit access command.

Responsive to determining that the different write command is a different forced unit access command, a new candidate journal area can be added where the new candidate journal area has a start LBA and an end LBA corresponding to the start LBA and the end LBA of the different forced unit access command. Responsive to determining that the different write command is not a forced unit access command, the command can be executed without marking the candidate journal area as the journal area.

Responsive to adding the new candidate journal area or updating the start LBA and the end LBA of the candidate journal area, a determination can be made as to whether the start LBA or the end LBA of the different write command is continuous to the start LBA or the end LBA of the candidate journal area or the new candidate journal area. Responsive to determining that the start LBA or the end LBA of the different write command is continuous to the start LBA or the end LBA of the candidate journal area of the new candidate journal area, an area hit counter for the candidate journal area or the new candidate journal area can be incremented.

Responsive to determining that the area hit counter of the candidate journal area is greater than the threshold, the candidate journal area can be marked as the journal area.

Responsive to determining that the area hit counter of the new candidate journal area is greater than the threshold, the new candidate journal area can be marked as the journal area. The new command can be executed responsive to marking the candidate journal area as the journal area and/or marking the new candidate journal area as the journal area.

Responsive to determining that the area hit counter of the candidate journal area is not greater than the threshold, the candidate journal area may not be marked as the journal are and the new command can be executed. Responsive to determining that the area hit counter of the new candidate journal area is not greater than the threshold, the new candidate journal area may not be marked as the journal area and the new command can be executed.

In various instances, a system can comprise a controller coupled to a memory device. The controller can be configured to monitor a plurality of received commands to identify a forced unit access command, identify a metadata area of the memory device based on the forced unit access command, and perform an action responsive to identifying a subsequent forced unit access command to the metadata area.

The controller can further identify a plurality of forced unit access commands including the forced unit access command and identify the metadata area of the memory device based on the plurality of forced unit access commands. The controller can also determine a start LBA and an end LBA for each of the plurality of forced unit access command. The controller can further determine a start LBA and an end LBA for the metadata area based at least on the start LBA and end LBA for each of the plurality of forced unit access commands.

In various examples, a system can comprise a controller coupled to a memory device and configured to identify a file system utilizing a plurality of access commands to the memory device and, responsive to identifying the file system, determine a start LBA and an end LBA of a metadata area of the memory device based on the plurality of access commands and the file system. The controller can further determine a write pattern of the plurality of access commands utilizing the start LBA, the end LBA, and the plurality of access commands and can perform an action based on the write pattern.

An F2FS can be identified utilizing the plurality of access commands to the memory device. A determination can be made as to whether the write pattern of the plurality of access commands is further configured to identify a checkpoint area of the metadata area. The checkpoint area can be identified utilizing a plurality of forced unit access commands from the plurality of access commands to the memory device. A start LBA and an end LBA for the plurality of forced unit access commands can be determined and the start LBA and the end LBA of the plurality of forced unit access commands can be assigned as a start LBA and an end LBA of the checkpoint area. Each of the plurality of forced unit access commands can be determined as having a same start LBA and a same end LBA. The start LBA of the check point can be assigned as the start LBA of the metadata area.

Figure 8:
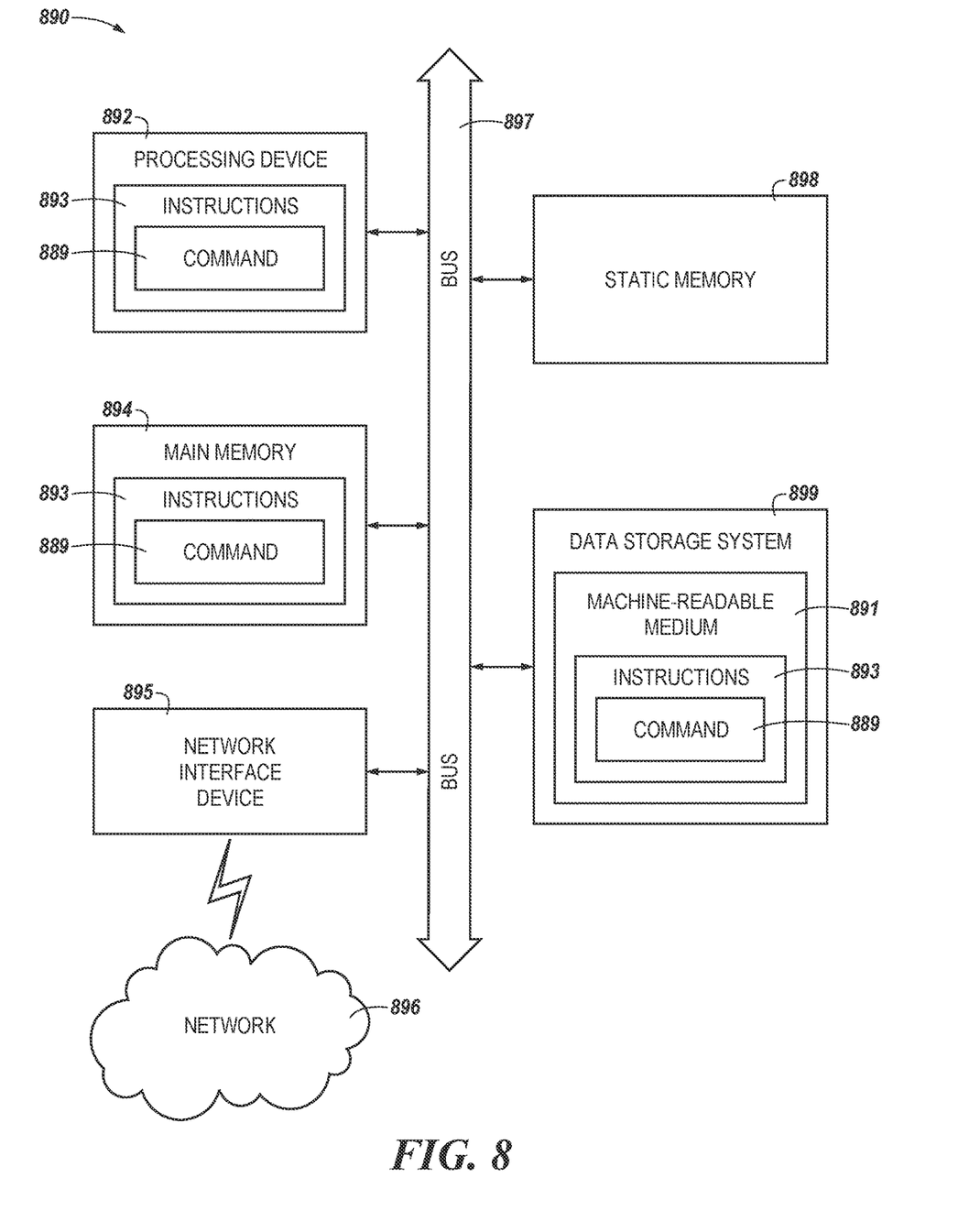
FIG. 8 is a block diagram of an example computer system in which embodiments of the present disclosure may operate.

FIG. 8 illustrates an example machine of a computer system 890 within which a set of instructions, for causing the machine to perform one or more of the methodologies discussed herein, can be executed. In some embodiments, the computer system 890 can be analogous to the memory sub-system controller 104 of FIG. 1. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or another machine capable of executing a set of instructions (sequential or otherwise) that specify actions to be taken by that machine. Further, while a single machine is illustrated, the term "machine" shall also be taken to include a collection of machines that individually or jointly execute a set (or multiple sets) of instructions to perform one or more of the methodologies discussed herein.

The example computer system 890 includes a processing device 892, a main memory 894 (e.g., read-only memory (ROM), flash memory, dynamic random access memory (DRAM) such as synchronous DRAM (SDRAM) or Rambus DRAM (RDRAM), etc.), a static memory 898 (e.g., flash memory, static random access memory (SRAM), etc.), and a data storage system 899, which communicate with each other via a bus 897. The data storage system 899 can be a memory sub-system such as memory sub-system 103 described in FIG. 1 (e.g., US, eMMC, etc.).

The processing device 892, which can be analogous to the processor 107 in FIG. 1, represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 892 can also be one or more special-purpose processing devices such as an application specific integrated circuit (ASIC), a field programmable gate array (FPGA), a digital signal processor (DSP), network processor, or the like. The processing device 892 is configured to execute instructions 893 for performing the operations and steps discussed herein. The computer system 890 can further include a network interface device 895 to communicate over the network 896.

The data storage system 899 can include a machine-readable storage medium 891 (also known as a computer-readable medium) on which is stored one or more sets of instructions 893 or software embodying one or more of the methodologies or functions described herein. The instructions 893 can also reside, completely or at least partially, within the main memory 894 and/or within the processing device 892 during execution thereof by the computer system 890, the main memory 894 and the processing device 892 also constituting machine-readable storage media. The machine-readable storage medium 891, data storage system 899, and/or main memory 894 can correspond to the memory sub-system 103 of FIG. 1.

In one embodiment, the instructions 893 include instructions to implement functionality corresponding to the detection component 109 of FIG. 1, The instructions can include a command instruction 889 associated with recognizing a file system, detecting a metadata area, and detecting an IO pattern for the metadata area (e.g., detection component 109 in FIG. 1). While the machine-readable storage medium 891 is shown in an example embodiment to be a single medium, the term "machine-readable storage medium" should be taken to include a single medium or multiple media that store the one or more sets of instructions. The term "machine-readable storage medium" shall also be taken to include a medium that is capable of storing or encoding a set of instructions for execution by the machine and that cause the machine to perform one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, types of disk including floppy disks, optical disks, CD-ROMs, and magnetic-optical disks, read-only memories (ROMs), random access memories (RAMs), EPROMs, EEPROMs, magnetic or optical cards, or type of media suitable for storing electronic instructions, each coupled to a computer system bus.

The algorithms and displays presented herein are not inherently related to a particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to a particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device;
a controller coupled to the memory device and configured to:
monitor a plurality of received commands to identify a received command having a tag identifying the received command corresponding to a metadata area;
identify the metadata area of the memory device based on the received command having the tag;
responsive to determining that a start LBA and an end LBA for a different write command is contiguous with a start LBA and an end LBA of the metadata area, update the start LBA and the end LBA of the metadata area to include the start LBA and the end LBA of the different write command; and
perform an action responsive to identifying a subsequent command to the metadata area having the tag.

2. The system of claim 1, wherein the controller is further configured to:
identify a plurality of access commands having the tag including the received command having the tag from the plurality of received commands; and
identify the metadata area of the memory device based on the plurality of access commands.

3. The system of claim 2, wherein the controller is further configured to determine a start logical block address (LBA) and an end LBA for each of the plurality of access commands.

4. The system of claim 3, wherein the controller configured to identify the metadata area is further configured to determine the start LBA and the end LBA for the metadata area based at least on the start LBA and end LBA for each of the plurality of access commands.

5. The system of claim 1, wherein the tag is a REL_WRITE tag.

6. A method comprising:
receiving a command at a memory sub-system;
determining whether the received command is a write command associated with writing data to a memory device of the memory sub-system without first writing the data to a cache;
determining a start LBA and an end LBA of a candidate journal area of the memory device of the memory sub-system based on the write command;
receiving a different command at the memory sub-system;
responsive to determining that the received different command is a different write command, determining whether a start LBA and an end LBA for the different write command is contiguous with the start LBA and the end LBA of the candidate journal area;

responsive to determining, via control circuitry of the memory sub-system, that the start LBA and the end LBA for the different write command is contiguous with the start LBA and the end LBA of the candidate journal area, updating the start LBA and the end LBA of the candidate journal area to include the start LBA and the end LBA of the different write command;

marking the candidate journal area as a journal area of the memory device responsive to the candidate journal area being accessed a threshold number of times; and taking an action responsive to a subsequent access to the journal area.

7. The method of claim 6, further comprising receiving the command following a receipt of a flush command.

8. The method of claim 6, further comprising determining whether the received command is executable to write the data directly to the memory device of the memory sub-system without first writing the data to the cache of the memory sub-system.

9. The method of claim 6, further comprising:

responsive to determining that the different write command is associated with writing different data to the memory device without first writing the different data to the cache of the memory sub-system, adding a new candidate journal area having a start LBA and an end LBA of the different write command; and responsive to determining that the different write command is associated with writing the different data to the memory device using the cache of the memory sub-system, executing the command without marking the candidate journal area as the journal area.

10. The method of claim 9, further comprising:

responsive to adding the new candidate journal area or updating the start LBA and the end LBA of the candidate journal area, determining whether the start LBA or the end LBA of the different write command is continuous to the start LBA or the end LBA of the candidate journal area or the new candidate journal area; and responsive to determining that the start LBA or the end LBA of the different write command is continuous to the start LBA or the end LBA of the candidate journal area of the new candidate journal area, incrementing an area hit counter for the candidate journal area or the new candidate journal area.

11. The method of claim 10, further comprising:

responsive to determining that the area hit counter of the candidate journal area is greater than the threshold, marking the candidate journal area as the journal area; and responsive to determining that the area hit counter of the new candidate journal area is greater than the threshold, marking the new candidate journal area as the journal area.

12. The method of claim 11, further comprising:

responsive to determining that the area hit counter of the candidate journal area is not greater than the threshold:

refraining from marking the candidate journal area as the journal area.

13. The method of claim 11, further comprising:

responsive to determining that the area hit counter of the new candidate journal area is not greater than the threshold:

refraining from marking the new candidate journal area as the journal area.

14. A system comprising:

a memory device;

a controller coupled to the memory device and configured to:

identify a file system utilizing a plurality of access commands to the memory device and responsive to determining that at least one of the plurality of access commands is a forced unit access command;

responsive to identifying the file system, determine a start logical block address (LBA) and an end LBA of a metadata area of the memory device based on the plurality of access commands and the file system;

responsive to determining that a start LBA and an end LBA for a different access command is contiguous with the start LBA and the end LBA of the metadata area, update the start LBA and the end LBA of the metadata area to include the start LBA and the end LBA of the different access command;

determine a write pattern of the plurality of access commands utilizing the start LBA, the end LBA, and the plurality of access commands; and perform an action based on the write pattern.

15. The system of claim 14, wherein the controller configured to identify the file system is further configured to identify a Flash Friendly Filesystem (F2FS) utilizing the plurality of access commands to the memory device.

16. The system of claim 14, wherein the controller configured to determine the write pattern of the plurality of access commands is further configured to identify a checkpoint area of the metadata area.

17. The system of claim 16, wherein the controller configured to identify the checkpoint area is further configured to identify the checkpoint area utilizing a plurality of forced unit access commands from the plurality of access commands to the memory device.

18. The system of claim 17, where the controller is further configured to:

determine a start LBA and an end LBA for the plurality of forced unit access commands; and assign the start LBA and the end LBA of the plurality of forced unit access commands as a start LBA and an end LBA of the checkpoint area.

19. The system of claim 18, wherein the controller configured to determine the start LBA and the end LBA for the plurality of forced unit access commands is further configured to determine that each of the plurality of forced unit access commands has a same start LBA and a same end LBA.

20. The system of claim 18, wherein the controller is further configured to assign the start LBA of the check point as the start LBA of the metadata area.

* * * * *